United States Patent
Flamme et al.

[11] Patent Number: 6,003,455
[45] Date of Patent: Dec. 21, 1999

[54] REGULATOR CONTROL

[75] Inventors: David Flamme, Hinsdale; Peter Dix, Naperville, both of Ill.

[73] Assignee: Case Corporation, Racine, Wis.

[21] Appl. No.: 09/035,243

[22] Filed: Mar. 5, 1998

[51] Int. Cl.⁶ ................................................. A01C 7/00
[52] U.S. Cl. .......................................... 111/200; 111/915
[58] Field of Search ............................. 111/52, 200, 900, 111/903, 904, 915; 172/2, 3, 4, 45; 221/8, 9, 3, 13; 340/200; 364/424.07

[56] References Cited

U.S. PATENT DOCUMENTS

| | | |
|---|---|---|
| 4,013,875 | 3/1977 | McGlynn . |
| 4,068,223 | 1/1978 | Steffen . |
| 4,259,829 | 4/1981 | Strubbe . |
| 4,296,409 | 10/1981 | Whitaker et al. . |
| 4,333,096 | 6/1982 | Jenkins et al. . |
| 4,413,685 | 11/1983 | Gremelspacher et al. . |
| 4,513,562 | 4/1985 | Strubbe . |
| 4,515,221 | 5/1985 | van der Lely . |
| 4,523,280 | 6/1985 | Bachman . |
| 4,530,463 | 7/1985 | Hiniker et al. . |
| 4,548,027 | 10/1985 | Maeoka . |
| 4,747,301 | 5/1988 | Bellanger . |
| 4,803,626 | 2/1989 | Bachman et al. . |
| 4,875,036 | 10/1989 | Washizuka et al. . |
| 4,875,378 | 10/1989 | Yamazaki et al. . |
| 4,896,223 | 1/1990 | Todome . |
| 4,994,973 | 2/1991 | Makino et al. . |
| 5,025,951 | 6/1991 | Hook et al. . |
| 5,046,665 | 9/1991 | Kor et al. . |
| 5,050,771 | 9/1991 | Hanson et al. . |
| 5,220,876 | 6/1993 | Monson et al. . |
| 5,260,875 | 11/1993 | Tofte et al. . |
| 5,323,721 | 6/1994 | Tofte et al. . |
| 5,424,957 | 6/1995 | Kerkhoff et al. . |
| 5,475,614 | 12/1995 | Tofte et al. . |
| 5,488,817 | 2/1996 | Paquet et al. . |
| 5,499,684 | 3/1996 | Stratton . |
| 5,551,218 | 9/1996 | Henderson et al. . |
| 5,557,510 | 9/1996 | McIntyre et al. . |
| 5,574,657 | 11/1996 | Tofte et al. . |
| 5,598,794 | 2/1997 | Harms et al. . |
| 5,621,666 | 4/1997 | O'Neall et al. . |
| 5,631,826 | 5/1997 | Chow . |
| 5,635,911 | 6/1997 | Landers et al. . |
| 5,646,846 | 7/1997 | Bruce et al. . |
| 5,684,476 | 11/1997 | Anderson . |

*Primary Examiner*—Robert E. Pezzuto
*Attorney, Agent, or Firm*—Foley & Lardner

[57] ABSTRACT

A system for control of operational parameters within agricultural implements such as seed planters includes an agricultural work vehicle such as a tractor with an operator's station; an agricultural implement connected to the vehicle; a control subsystem including means for inputting a set point and for providing a control signal, located at the operator's station; a display connected to the control subsystem and located at the operator's station; an actuator connected to the control subsystem and located upon the implement; and a sensor connected to the display and located upon the implement. In one embodiment, the system further includes a source of low pressure air such as a fan, the implement is a seed planter having at least one substantially closed hopper or bin pressurized by the air, the actuator is a fan drive speed control apparatus, and the sensor is a pressure transducer configured to measure air pressure within the bin and connected to both the control subsystem and the display. The control subsystem causes the fan drive speed control apparatus to vary fan speed and, fan outlet pressure being a function of fan speed, thereby controllably modulate air pressure within the bin.

20 Claims, 5 Drawing Sheets

REGULATOR CONTROL

FIELD OF THE INVENTION

The present invention relates generally to monitoring and controlling of parameters of operation in an agricultural implement, and more particularly to control of parameters which are desired to remain nominally constant in both steady state and non steady state operating environments.

BACKGROUND OF THE INVENTION

Planting implements are used for planting seeds in agricultural fields. One type, the seed drill, used for many crops including grain of small seed size, deposits seeds in a substantially continuous stream. A second type, the seed planter, used for larger plants such as corn which often have larger seeds, meters and places seeds individually, spaced apart within the row to avoid over crowding of the plants. Planting implements produced by Case Corporation, the assignee of this invention, plant up to 60 rows simultaneously in a 60 foot wide swath, and may additionally and concurrently apply other products such as fertilizers, herbicides, insecticides, and pH buffers.

Herbicides and insecticides are used in smaller quantities and are dispensed from individual bins provided for each row of crop, but seed and fertilizer, which are used in larger quantities, are stored in one or more larger central hoppers or tanks and must be conveyed from the hopper or tank to each row, distributed equally among the rows, and metered for proper application rate. Several larger hoppers are often mounted upon an implement, or a still larger hopper is provided its own wheels and is towed behind the planter or seed drill. While liquid products may be pumped to each row unit and metered for equal distribution among the row units with ease by those familiar with the art, granular products are less easily conveyed and metered. One solution to this problem has been the entraining of dry product in a stream of low-pressure air to convey the product through a duct or hose, and the utilization of manifolds to equally distribute the product among the row units. Low-pressure air is also used in the metering of seeds in planters, as well as in propelling the seeds through lengths of tube to the seed bed. Different air pressures are often necessary in different parts of a system for proper performance of the planting operation, and these pressures must be regulated by adjustment of fan speeds, damper positions, and the like.

Seed application rates, in terms of, for example, seeds per lineal foot traversed, are adjustable by the operator for different crops and growing conditions. A desired application rate having been established by the operator and the implement adjusted to that rate, it is highly desirable for the implement to steadily continue applying at that rate. If too much seed is applied, expensive seed will have been wasted, excessive down time will be incurred reloading the bins more often than should have been necessary, and plants will be crowded together too closely. If too little seed is applied, a smaller harvest than anticipated will be realized. Similarly deleterious results can occur if other product is not applied at the expected rates; too much of any product may damage or kill the seed or seedlings, while too little may leave the plants undernourished or unprotected.

Various styles and sizes of feed rolls, drums, and similar devices are available for different sizes, types, and shapes of seed and other product. They are selected by the operator and replaced as needed for changes in product being applied, usually with a relatively high degree of certainty that a proper selection has been made. Air pressure adjustment is frequently less certain, however, and is often performed by changing speed of a fan or blower from outside the implement with the tractor and implement stopped. Several iterations of stopping to check seed bed for proper application rate and consequent readjustment of fan speed may be necessary to achieve best performance, particularly if more than one product is being applied concurrently and more than one pressure must be adjusted.

Making such adjustments using iterative trial-and-error technique is a time consuming and sometimes aggravating endeavor. In some devices, such as spring-and-diaphragm pressure reducing or regulating valves, the adjustments may then at least remain undisturbed in spite of external influences such as temperature, or other weather, changes between, for example, early morning and noon, or such as high levels of vibration sometimes encountered in agricultural field operations. In other instances, droop may occur in a regulator due to a large change in load. In any such situation, a readjustment of an operating parameter may be needed or would at least be beneficial, but the need may go unnoticed due to other demands upon the operator's attention or may be thought not worth the cost or inconvenience of the one or more stops needed to make the adjustment.

An open loop control system for regulated parameters, with a real time display of actual measured values of those parameters, would make even iterative adjustments quickly and easily performed from the cab of a tractor or other vehicle while remaining in motion and in operation. A closed loop control system would further obviate the need for the system operator to frequently monitor those values and make adjustments, and would essentially perform that task for the operator and thereby free him to more closely attend to progress of the field operation itself.

One device is currently commercially available for the monitoring and control of multiple implement air velocities by adjustment of a single fan speed and of multiple branch circuit air valve settings from the cab of a tractor while the tractor and implement are in operative motion. It would be desirable, however, if additional parameters, including multiple bin pressures, could be monitored and adjusted, as well as recorded in a printout or a memory device, while the implement and tractor were in normal operative motion. It would also be desirable to be able to monitor and control bin pressures directly in units of pressure, rather than only indirectly in units of fan speed or air velocity. It would additionally be desirable to be able to monitor lubricating oil pressure of an engine or engines on the implement if the implement is so equipped. It would further be desirable to monitor and control depth or force of engagement with the soil of the seed bed ground opening tool.

It would still further be desirable, for maximum efficiency and productivity of the farming operation, to be able to variably control the ground opening tool depth or force of soil penetration using site-specific penetration depth or force set points stored in a memory device. The memory device may be programmed with a precision farming Geographic Information System (GIS) map layer or data base, and Global Positioning System (GPS) and Differential Global Positioning System (DGPS) technology and equipment could be used to accurately locate the tractor and implement with respect to the GIS locational coordinates.

Regulated parameters in an agricultural implement have heretofore been adjusted to constant values and left unchanged throughout the performance of an operation through an entire field or set of fields. However, the relatively recent inception and rapid development of site-specific precision farming techniques now make some such parameters, such as planter ground opening depth and force, operational variables which can be readily programmed and controlled on the fly.

SUMMARY OF THE INVENTION

The present invention accordingly provides a system for the control of regulated parameters in agricultural implements, particularly planting implements. The system can simultaneously monitor, record, and control one or more parameters such as product bin air pressures, product delivery tube air velocities, fan and pump speeds; implement hydraulic fluid and engine oil, fuel, etc. pressures and flow rates; and ground opening tool depth and/or force of soil engagement. Units of measure may be selected by the operator (e.g., psi or kPa of pressure, inches or centimeters of mercury, pounds or newtons of ground opening force, inches or centimeters of ground penetration, etc.) through an operator interface located with a display device at the operator's station of the agricultural vehicle being used. It may do so using either open or closed loop control of the parameter in accordance with a set point programmed either manually by the operator or automatically and variably, in a site specific manner and in real time, by a precision farming geographic information system (GIS) data base. The GIS data base may use locational reference data obtained from on-board global positioning system (GPS) and differential GPS (DGPS) receiving and processing equipment.

Specifically, one embodiment of the invention provides a system for setting, from the cab of an agricultural tractor, values of at least one operating parameter on an agricultural implement which is connected to the tractor and moved across an agricultural field by the tractor. The system includes a tractor having an operator's station; an open loop electronic control system supported by the tractor and having a set point input means and a constant value control signal generating means; an actuator supported by the implement, connected to the control circuit, and configured to cause the steady state operating value of the parameter to be substantially equal to that of the set point; a sensor supported by the implement and configured to measure the actual value of the parameter and to communicate the measured value to the operator's station; and a display device supported by the operator's station, connected to the sensor and to the control circuit and configured to exhibit system information including at least the set point and measured value of the parameter. This embodiment of the invention enables regulation and monitoring, from within the tractor cab and while in operation, of implement operating parameters including but not limited to fluid pressures, soil engaging tool displacements and forces, and fan and pump speeds.

A second embodiment of the invention further provides a system including a closed loop, or feedback, control circuit wherein the control circuit compares a measured value of the parameter to a set point value, generates an error signal proportional to the difference, and accordingly varies a control output signal to an actuator in proportion to the error signal in order to maintain the error signal substantially equal to zero and thereby control the parameter with greater constancy, particularly when operating under nonuniform conditions.

A third embodiment of the invention further provides a plurality of pressurized agricultural product bins upon the implement, the plurality of bins being divided into at least two groups containing different products requiring different bin air pressures for best delivery to the soil. For example, one group of bins may contain seeds and another may contain fertilizer or other product, alone or in combination. The control circuit is provided with a control channel for each product or group of bins, each channel including a set point input means and control output signal generating means. Each group of bins is provided with a pressure sensor and an actuator connected to its corresponding control channel. The display exhibits all set points and sensor measurements at the operator's station, in textual or graphical screen format and in units of measurement selectable by the operator.

A fourth embodiment of the invention still further provides a system for measurement and control of planter ground opening tool engagement depth or force, selected either automatically by a GIS prescriptive map residing in memory or manually by switch, keypad, or other operator input device located at the operator's station.

A fifth embodiment of the invention yet further provides a method of automatically controlling nominally regulated parameters, wherein the control circuit set point is spatially variable and is stored correlated with corresponding locational data in a memory device which has been programmed with a site-specific, precision farming prescriptive map. The map may have been created using a Geographic Information System (GIS) data base generated from data obtained in prior field operations, and may include longitudinal and latitudinal coordinates. The system may include antenna, receiver, and signal processing circuit to generate Global Positioning System (GPS) and Differential Global Positioning System (DGPS) locational signals corresponding to the implement's location within the field, whereby the corresponding correlated set point value may be read from memory for use in the control circuit.

Other advantages of the invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The invention will become more fully understood from the following detailed description, taken in conjunction with the accompanying drawings wherein like reference numerals refer to like parts.

DETAILED DESCRIPTION OF PREFERRED EXEMPLARY EMBODIMENTS

Figure 1:
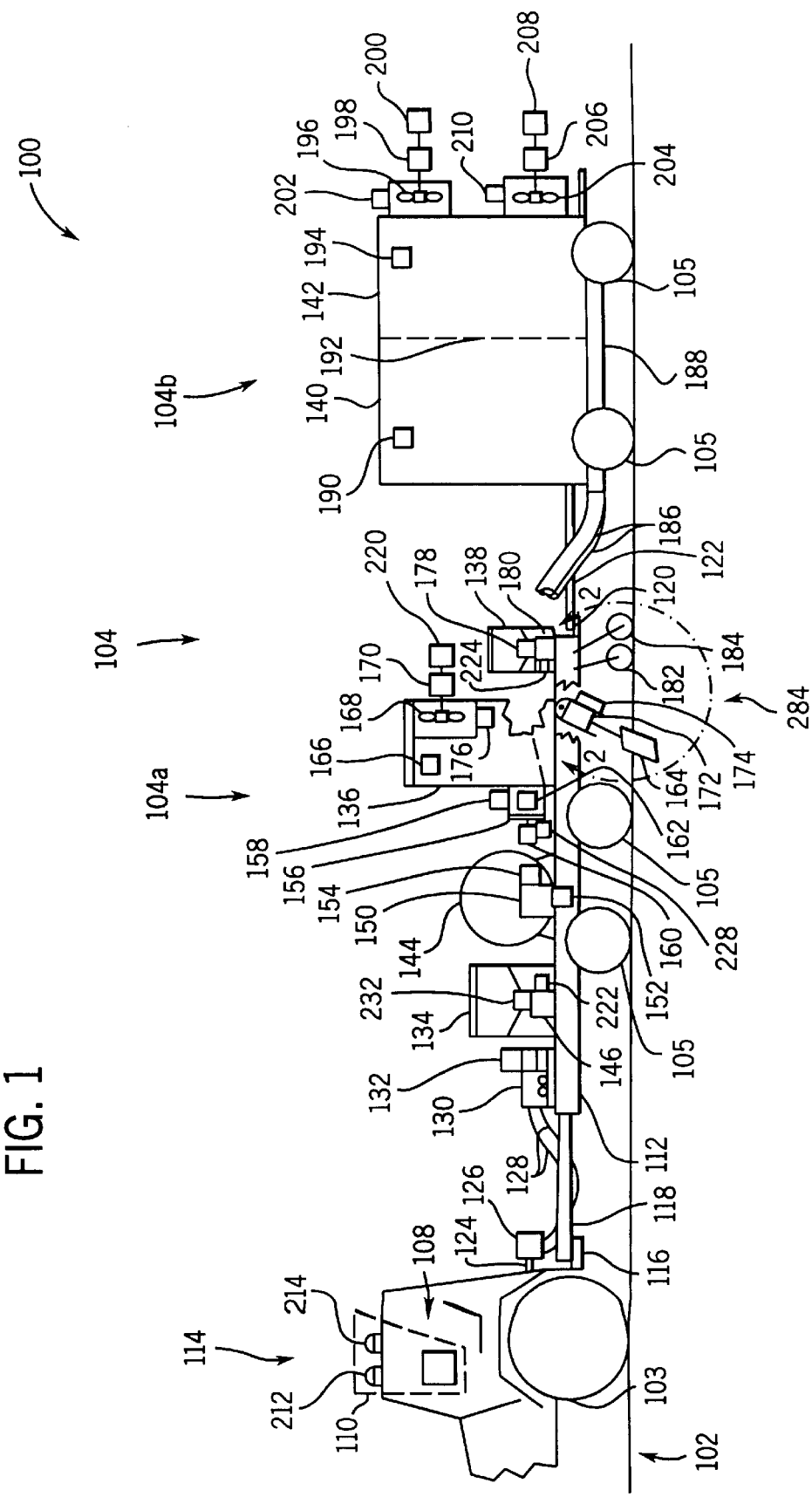
FIG. 1 is a fragmentary side elevation view of a system including an agricultural tractor and an implement provided with a control circuit, the system in conformance with the invention.

Referring to FIG. 1, a farming system 100 is shown. System 100 includes an agricultural implement 104, in the illustrated instance comprising a row crop seed planter 104a and a support hopper supply implement 104b, which are associated with and propelled by an agricultural work vehicle, in the illustrated instance a tractor 102. In the illustrated instance the implement 104 rides upon its own wheels 105 and is towed by the tractor 102, but an implement supported by the tractor's 102 three-point hitch and thereby effectively riding upon the tractor's 102 wheels 103 would be equally within the scope and spirit of the invention.

Implement 104 has been illustrated, and is discussed below, as a row crop seed planter because such a planter is a relatively complex implement having a number of subsystems and hence is particularly well suited for illustration and discussion of the invention. Other types of agricultural vehicles and implements 104 are, however, equally within the scope and spirit of the invention if they include at least one parameter which is variable but which is normally regulated to a constant value during a field operation (e.g., rotor speed of a combine).

The tractor 102 may include a drawbar 116 for the towing of implements, an operator's station 108 in the tractor cab, a control system core subsystem 110, locational signal receiving antennae 212 and 214, and a power take off (PTO) shaft 124 usable for transferring a portion of the tractor's 102 engine power to the implement 104. A hydraulic pump 126 may be mounted upon and driven by the PTO shaft 124, and may be coupled by appropriate hydraulic fluid conductors 128 to a hydraulic power unit (HPU) 130.

HPU 130 is shown supported by implement 104a, but may instead be supported by tractor 102. HPU 130 may be a conventional hydraulic power unit, described below. Hydraulic pump 126 may be a single-section pump whose flow is apportioned to various loads upon implement 104 by control valves, or may be a multiple section pump with the flow of each section dedicated to a particular load or group of loads. Particularly with tractors not including a PTO 124, pump 126 may be an accessory pump permanently installed to tractor 102. HPU 130 is shown provided with a pressure transducer 132 for monitoring and control of hydraulic system pressure.

Figure 2:
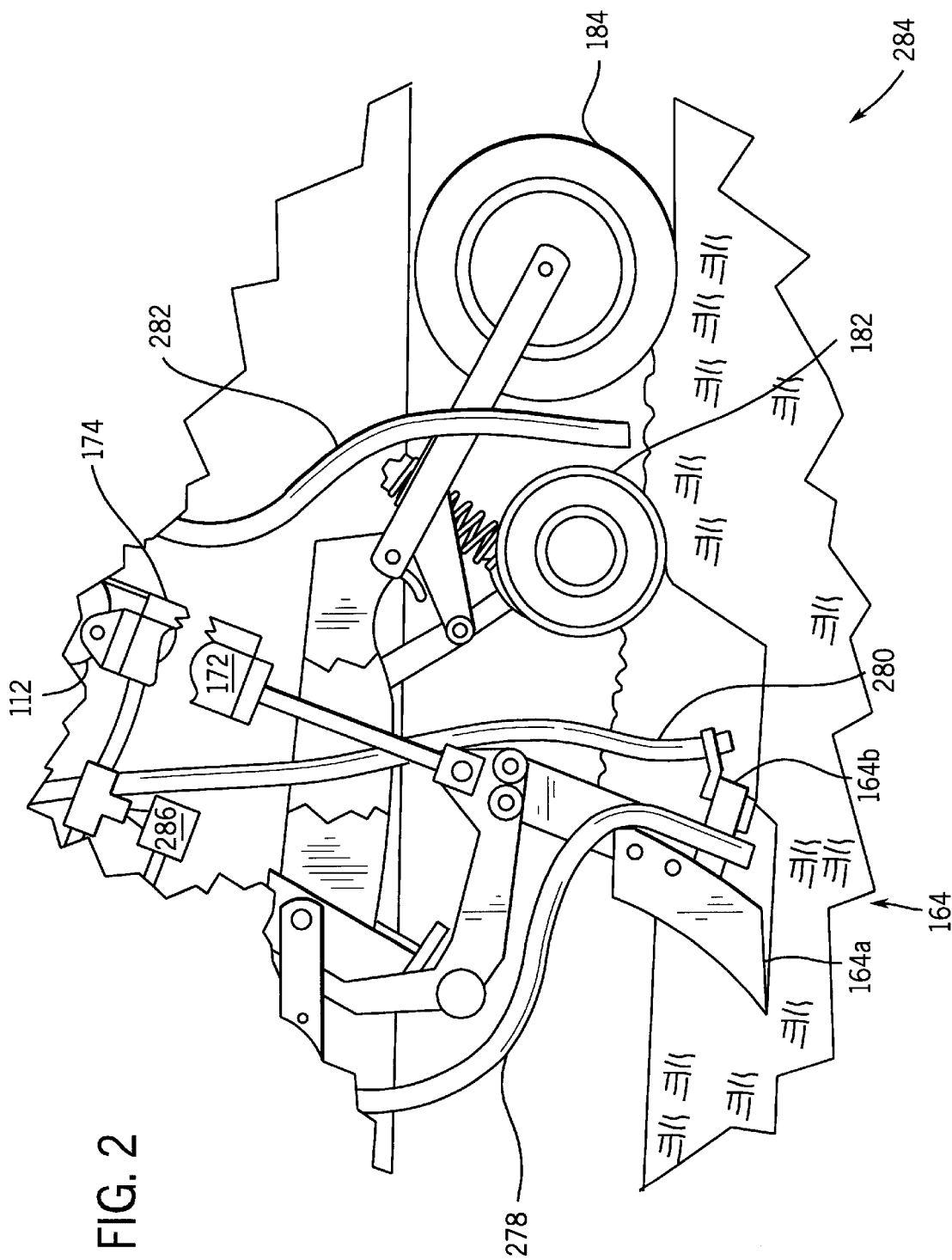
FIG. 2 is an enlarged fragmentary side elevation view of a portion of the implement shown in FIG. 1 and within the dashed circle labelled "FIG. 2".

Still referring to FIG. 1, the implement 104a includes a frame 112 connected by a tongue 118 to the tractor's 102 drawbar 116, whereby it may be traversed across a field of land. Implement 104a supports various equipment for the application of seed and other products to the soil of a field. This equipment includes, proceeding from the front of implement 104a to the rear, a hopper 134 for the storage of a granular fertilizer, a tank 144 for the storage of a liquid fertilizer, a seed hopper 136, a ground (furrow) opening tool 164, a herbicide/insecticide bin 138, a furrow closing tool 182, and a furrow pressing tool 184. While FIG. 1 shows only one of each of the above devices, it is to be understood that row crop planting implements 104a typically plant multiple, parallel rows simultaneously. For example, implements produced by Case Corporation, the assignee of the present invention, may include sufficient bins, hoppers, tanks, furrow opening and closing tools, etc. to plant up to 60 rows in a swath 60 feet wide. Accordingly, each planting implement 104a is typically provided with one row unit 284 (shown in greater detail in FIG. 2) for each row to be planted. As shown in FIGS. 1 and 2, a row unit 284 typically includes a furrow opening tool 164, a furrow closing tool 182, a furrow pressing tool 184, a herbicide/insecticide bin 138, a metering feeder 180, a sensor 178, an actuator 226, a motor 224, and a dispensing tube 282. Hoppers, bins, and tanks for products other than insecticides and/or herbicides are often provided in larger sizes and smaller quantities, with each hopper, bin, or tank metering and distributing product to several rows.

The term "actuator" as used herein refers to a device or apparatus which is configured to receive a control signal and which may be used to effect a corresponding change in a parameter of interest; for example, a solenoid-operated or solenoid-controlled, pilot-operated spool valve adjusting rate of flow of high-pressure hydraulic fluid to a hydraulic motor to change its speed or to a cylinder to change its length, in response to a control action exerted by a control circuit or a proportional controller and communicated to the actuator in the form of a control signal.

Figure 4:
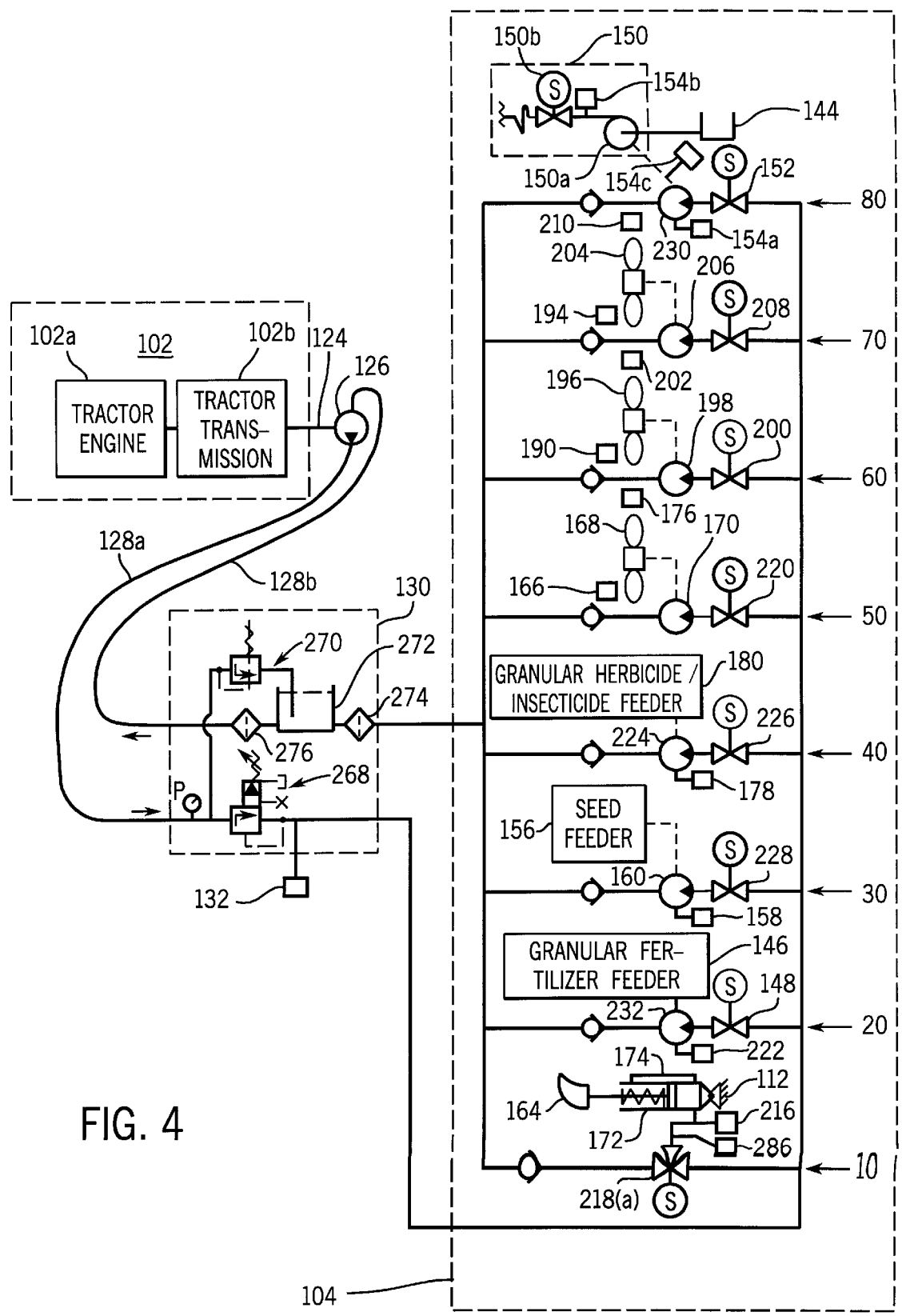
FIG. 4 is a hydraulic schematic of a system in compliance with the invention.

Apparatus is necessary for the metering and dispensing to ground of product contained within the above vessels. Referring again to FIG. 1 alone, a granular material feeder 146 may be located at the bottom of granular fertilizer hopper 134, and may be a rotational device driven by a motor 232 or by a wheel in contact with the ground and connected to the feeder by a chain drive or other appropriate power transmission apparatus. The material feeder 146 may be a positive displacement device delivering a specific amount of product per revolution, whereby the application rate of the granular fertilizer may be calibrated to the rotational speed of the feeder 146. Such a positive displacement device may include a housing containing an augur, a cylindrical roll whose peripheral surface is longitudinally fluted with grooves, or a rotor similar in configuration to the impeller of a gear pump or a rigid vane pump. Product delivery rate of the feeder 146 may therefore be monitored by measuring the speed of feeder 146 using a speed sensor 222 and may be controlled by a proportional actuator 148 (FIG. 4). For a feeder 146 of rotational configuration, rotational speed may be measured by a tachometer sensor such as a magnetic pickup gapped to a ferromagnetic gear or such as a phototach. If motor 232 is a hydraulic motor, the proportional actuator 148 may be a speed control actuator consisting of a hydraulic flow modulating valve, which may itself be solenoid controlled by a proportional pulse width modulated (PWM) signal. If, alternatively, motor 232 is an electrical device, which may be powered by the tractor's 102 DC electrical system, the proportional actuator 148 may be a resistive or solid state speed control circuit which modulates voltage level or pulse width. In any event, the granular fertilizer is applied to the seed bed from the metering device through a delivery tube 278, shown in FIG. 2.

Referring once again to FIG. 1, liquid fertilizer or other product may be dispensed from a tank 144 by a product pump 150 provided with a sensor 154 and a control actuator 152. The product pump 150 may be a positive displacement device such as a piston, gear, rigid vane, or peristaltic pump, in which case product flow rate may be calibrated to pump 150 speed and monitored by a sensor 154 of pump 150 speed, or motor 230 speed, and controlled by an actuator 152. Alternatively, pump 150 may be a non positive displacement device followed by a modulating valve 150b (shown in FIG. 4) which may be used to control flow rate. Flow rate may then be monitored by a flow meter in the liquid product delivery line, or by a pressure transducer measuring product pressure in the product conduit between the pump 150 and the valve 150b, valve 150b having been calibrated for product flow rate vs. product pressure drop across the valve.

In a seed drill, used for planting crops which are closely spaced, seed is dispensed to the seed bed in a substantially continuous flow much as is the dry fertilizer referred to above and using similar apparatus. In a seed planter, however, used for planting crops such as corn which require defined spacing between plants and therefore must dispense individual seeds at reasonably accurately controlled intervals, special metering and feeding devices are required. One such device, a product of the Case Corporation, assignee of the present invention, is the Cyclo Air™ seed metering system which utilizes a rotating, pocketed drum 156, wherein each pocket carries a seed to the open end of a tube 280 (shown in FIG. 2), the tube 280 extending down to the seed bed. Seed linear pitch, or dimensional interval in the seed bed, is easily calibrated as a function of implement 104*a* ground speed, circular pitch of the perforations in the drum 156, and drum 156 rotational speed. Drum 156 may be rotationally driven by a hydraulic or electric motor 160, its speed measured by a magnetic or photo tachometer 158, and its speed controlled by a control actuator such as a hydraulic valve 228 (shown in FIG. 4) or a DC motor control circuit. The drum speed control signal may be generated in partial response to an implement 104 ground speed signal, which may be obtained from existing tractor 102 instrumentation or may itself be generated by an implement ground speed measuring circuit, utilizing one of the wheel speed measuring methods and apparatus well known to those familiar with the art or a radar device oriented toward the soil surface.

As shown in FIG. 1, seed hopper 136 and feeder 156 are pressurized with low pressure air for optimum performance, and to propel each seed down to the furrow through delivery tube 280. The low pressure air is supplied by a fan 168, which may be driven by a hydraulic or electric motor 170. Speed of the motor 170, and thereby of the fan 168, may be controlled by an actuator 220 in response to a signal from a speed sensor 176, or in response to signals from pressure transducers 166 or 162. Which of the three measured variables is used as feedback to a closed loop control circuit (not shown) will depend upon which of the three parameters the operator has programmed into the control circuit as a set point. Alternatively, open loop control of a plurality of fans may be provided and the sensed pressures and fan speeds merely monitored.

Herbicide/insecticide bin 138 is provided with a granular product metering and feeding device 180, sensor 178, and control actuator 224, the description and operation of which are similar to those of the granular fertilizer feeder 146, sensor 148, and control actuator 222 described above. Herbicides and insecticides are similarly delivered to the soil through tubes 282, as shown in FIG. 2.

Referring still to FIG. 1, a soil engaging tool 164 is used to open a seed bed furrow in the soil. The position of tool 164 with respect to the implement frame 112, and thereby with respect to the surface of the soil, is variable by displacement of a device 172 adjustable in both length and in force longitudinally exerted, which device 172 is in the preferred embodiment a hydraulic cylinder having at least one fluid port in its housing for entry and egress of hydraulic fluid at pressure. However, an electromechanical linear actuator or similar device may instead be employed. Both force and depth of penetration into the soil by tool 164 are therefore variable. The operator may select either parameter from the operator's station 108 in tractor 102, and select or adjust a setpoint for the parameter selected. Depth of penetration of tool 164 into the soil may be measured by a displacement transducer 174 supported by cylinder 172, while force of penetration is proportional to pressure of the hydraulic fluid within cylinder 172 and may therefore be measured by a pressure transducer 174.

Also shown in FIG. 1, as part of the implement 104, is a larger support hopper supply implement 104*b* supported upon its own wheels and towed by a tongue 122 connected to a drawbar 184 mounted upon the rear of implement 104*a*. Such larger hopper systems 104*b* are utilized for product, often granular fertilizer, in the planting of large fields in order to reduce the number of stops required to refill hoppers on seed planters 104*a*, and also in the use of seed drills 104*a* having configurations which do not readily allow mounting of hoppers 134, 136 or bins 138 upon them. Such devices are often divided by one or more partition walls 192 into two or more hoppers 140, 142. In the illustrated instance, product is delivered to implement 104*a* from metering feeders 188 located on hopper system 104*b* through hoses 186 by low pressure air provided by fans 196, 198 also located on hopper system 104*b*. Fans 196, 198 are used both to pressurize hoppers 140, 142 through connecting ducts or tubes (not shown) and to provide air streams through hoses 186 which entrain the dry product and carry it to implement 104*a* for distribution to the soil or for refilling of hoppers and bins upon implement 104*a*. Speeds of motors 198, 206 driving fans 196, 204, and thereby speeds of fans 196, 204, and consequently the associated air velocities and pressures, may be controlled by actuators 200, 208 in correspondence to control signals received from and generated by open or closed loop controllers in response to signals from fan speed sensors 202, 210 or pressure transducers 190, 194, as preferred and selected by the operator. The operator may select or adjust pressure or fan 196, 204 speed set points, independently of each other for each product, from the operator's station 108 in tractor 102 during the field operation. Pressures of air within hoppers 140, 142 and speeds of fans 196, 204 may be displayed at the operator's station 108 on a display device 240 (shown in FIG. 5). The speeds of prime movers 198 and 206 of fans 196 and 204, respectively, are controlled by actuators 200 and 208, respectively. The prime movers 198 and 206 may be hydraulic motors controlled by modulating valves, electric motors controlled by speed control circuits, or engines controlled by throttle or fuel rate actuators receiving control signals. Alternatively, air velocities may be controlled by in-line dampers or bleed-off dampers functioning as waste gates.

Proceeding now to FIG. 2, a fragmentary sectional view through a row unit 284 and a seed bed furrow is shown. A ground opening tool 164 is movably mounted to the frame 112 of implement 104*a* by a hydraulic cylinder 172. Cylinder 172 is provided with a position sensor 174 to allow monitoring of cylinder extension, and thereby depth of engagement of tool 164 into the soil, as well as with a pressure transducer 286 to allow monitoring of pressure of hydraulic fluid within cylinder 172, and thereby force of engagement of tool 164 with the soil.

In operation tool 164*a* opens a furrow within the soil, the furrow functioning as a seed bed. Granular or liquid fertilizer may then be deposited upon the floor of the furrow through tube 278. To prevent seed from being chemically "burned" by the fertilizer, a plate or shoe 164*b* on the trailing side of the opening tool 164 partially covers the fertilizer, thereby creating a new floor in the furrow. Seed is then deposited upon the new floor of the partially filled furrow through tube 280, after which furrow closing tool 182 replaces the remaining displaced soil into the furrow. Insecticide and/or herbicide, if being used, may then be dispensed upon the surface of the closed furrow through tube 282. Pressing tool 184 then compacts the replaced loose soil, incorporating the herbicide or insecticide into the soil while doing so.

Figure 3:
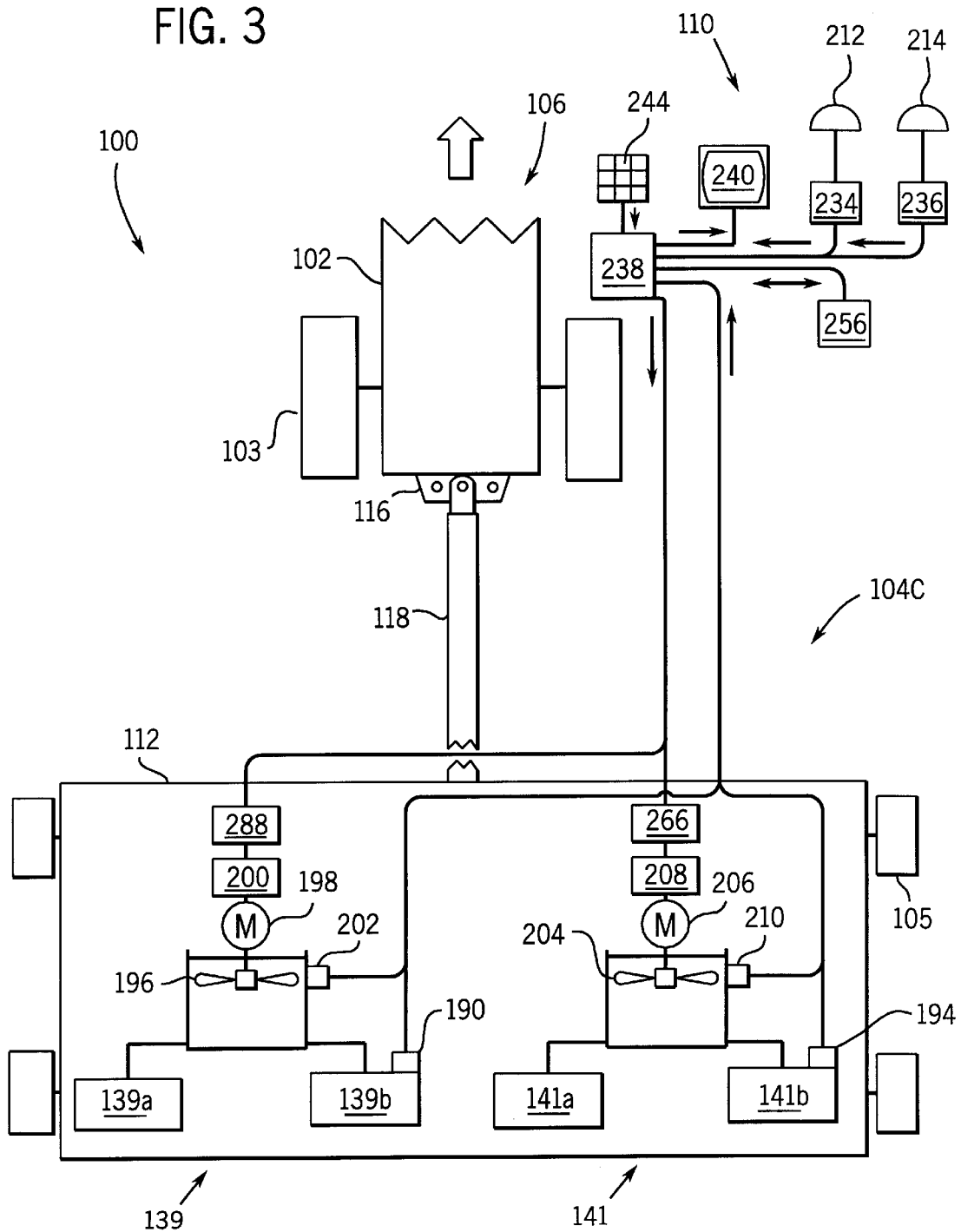
FIG. 3 is a fragmentary plan view and partial schematic of a system including an agricultural tractor and an implement provided with a control circuit, the system constructed in agreement with the present invention.

Referring now to FIG. 3, a farming system 100 includes a work vehicle, in the illustrated instance a tractor 102 riding upon wheels 103 and provided with a drawbar 116 and an operator's station 108. An agricultural implement 104*c*, having a frame 112, rides upon wheels 105 and is connected to the tractor's drawbar 116 by a tongue 118. The implement 104*c* is provided with four bins divided into two groups, a first group 139 including bins 139*a*, 139*b* and a second group 141 including bins 141*a*, 141*b*. The bins are pressurized, in the illustrated instance with low pressure air obtained from fans 196, 204. Fans 196, 204 are driven by prime movers 198, 206, which may be hydraulic or electric motors, internal combustion engines, or other appropriate sources of power which are variable in speed. Speeds of fans 196, 204 are measured by sensors 202, 210 which may be magnetic or optical pickups or other tachometric device known to those familiar with the art. Pressure of the air within the first group of bins 139 is measured by a first pressure transducer 190, and within the second group of bins 141 by a second pressure transducer 194. Speeds of motors or engines 198, 206 may be controlled by proportional actuators 200, 208, which actuators may be hydraulic control valves, DC control circuits, or throttle or fuel rate controllers, as appropriate for the types of prime movers 198, 206 in use.

Tractor 102 is provided with the core subsystem 110 (shown also in FIG. 5) of a control system connected to the speed sensors 202, 210, the pressure transducers 190, 194, and the proportional actuators 200, 208. The control system and its core subsystem 110 include at least a data processing unit (DPU) 238, a display unit (DU) 240, and an operator's interface means 244. Operator's interface means 244 may be a keyboard, a touchscreen keypad, a switch array, or other means of entering commands and numerical setpoint values into DPU 238 or of selecting them from a setup display screen on DU 240. DU 240 also displays screens exhibiting system information during the performance of a field operation, which information may include but not be limited to locations of bins 139, 141 upon or within the implement 104*c*; values of setpoints of all parameters being controlled by the system (in the illustrated instance, desired pressures of air within bins 139, 141 or desired speeds of fans 196, 204), and present values of all parameters being measured (in the illustrated instance, actual pressures of air within bins 139, 141 and actual speeds of fans 196, 204). In operation, DPU 238 sends control signals representative of the set points to proportional controllers 288, 266, which process the signals and forward them to proportional actuators 200, 208. Core subsystem 110 may also include a portable memory device 256 and a means of writing to it and/or reading from it, so that (a) system information may be stored for later entry into a data base in a remote computer 258 (shown in FIG. 5) and/or (b) a prescription map may be used for programming parameter set points into DPU 238 in a site-specific manner. Core subsystem 110 may additionally include a global positioning system (GPS) antenna 212 and receiver 234, as well as a corrective differential global position system (DGPS) antenna 214 and receiver 236, to provide real time signals representative of current location of implement 104*a* within the field, such locational information being necessary for use of a site-specific prescriptive map.

Proceeding now to FIG. 4, a hydraulic schematic is shown for an embodiment 100 of the present invention in which various devices are hydraulically operated. The engine 102*a* of tractor 102 drives a power take off (PTO) shaft 124 through a transmission 102*b*. A hydraulic pump 126 is mounted upon the PTO shaft 124, and is connected to a hydraulic power unit (HPU) 130 through high pressure (output) conductor 128*a* and low pressure (input, or suction) conductor 128*b*. HPU 130 may be supported by the implement 104 or by the tractor 102, and pump 126 may be a permanently installed tractor 102 accessory pump if the tractor 102 is not provided with a PTO shaft 124. Alternatively, a prime mover such as an engine or a motor may be supported by the implement and coupled to pump 126.

HPU 130 may be a conventional hydraulic power unit well known in configuration and content to those skilled in the art. It may include a fluid sump or reservoir 272 having a first port for supply of fluid to pump 126 and a second port for return of fluid from the load side of the hydraulic circuit, a relief valve 270 to protect the circuit from excess pressure at no flow or low flow conditions and the pump 126 from operating stalled when there is no flow through the load side of the circuit, and a pressure regulating valve (PRV) 268. It may also include a suction strainer 276 in the line connecting sump 272 to the suction port of pump 126 and a return line filter 274. PRV 268 may be pilot operated and solenoid controlled, to enable setting or changing system pressure from the operator's station 108 during field operations. A pressure transducer 132 may then be provided, to allow measurement of system pressure and display of the value upon a display device 240 (FIG. 5) as well as a feedback signal for closed loop control of the hydraulic fluid pressure.

Hydraulic fluid is thus supplied from the outlet of pump 126 at a pressure regulated by PRV 268 to the various load branches 10 through 80, inclusive, located within or upon implement 104. The fluid may be carried by conduits such as hose, pipe, or tube, depending upon the particular system's flow rates, pressures, and degree of flexing due to, for example, vibration of implement 104, flex of frame 112, and flex of the individual hydraulic devices and of their support structures. It is to be understood that the load branches 10 through 80 shown in FIG. 4 are merely illustrative, and that a particular implement 104 may have more or fewer branches than those shown, and that other devices may be included. For example, implement 104 may be provided with one or more engines, each requiring a throttle or fuel rate actuator and measurement of rotational speed and of lubricating oil pressure. Five, for example, seed hoppers, each having an associated fan, may be provided, as well as, again for example, 36 herbicide/insecticide bins. The processes and devices shown are therefore merely illustrative and representative.

Illustrated schematically in a load branch 10 of FIG. 4, as well as mechanically in FIG. 2, a hydraulic cylinder 172 is shown coupled to a soil engaging tool 164. While cylinder 172 is shown as a single-acting cylinder provided with a return spring and a single cap-end port, it may instead be a double acting cylinder with a port at each end. In the illustrated instance, hydraulic fluid under pressure is admitted by an actuator 218 through the port into the interior of cylinder 172, where it acts upon a piston and extends the cylinder, forcing tool 164 away from frame 112 and thereby into engagement with the soil. In the illustrated instance the actuator 218 is a three-port solenoid operated valve, but other configurations may he used and readily adapted by one skilled in the art.

Sensor 174 is a cylinder 172 extension measuring device which may measure the position of the piston relative to an end of the housing of cylinder 172, and may be connected to DPU 238 (FIG. 5) to provide core subsystem 110 (shown in FIGS. 1 and 5) with a piston position signal for display as a tool 164 position value, as well as to provide a proportional controller (not shown) with a piston position feedback signal for closed loop control of the depth of penetration of tool 164 into the soil. Alternatively, a flow meter 286 may be provided in the high pressure fluid supply line coupling actuator 218 to cylinder 172, and its output signal integrated by DPU 238 to provide a position signal. To prevent accumulation of error in this signal, a limit switch or similar device may be provided to signal DPU 238 when cylinder 172 reaches its fully contracted position so that DPU 238 may then zero any remaining position signal, such signal being an error, or may store it for use as an offset in correction of subsequent position signals.

Sensor 216 is a pressure transducer for measurement of pressure of the fluid within the cylinder, and provides a pressure signal to DPU 238 for display as force of engagement of tool 164 with the soil as well as to a proportional controller for use as a feedback signal for closed loop control of tool 164 force of penetration into the soil. Cylinder 172 may instead be an electromechanical actuator such as a leadscrew or a ballscrew, driven by an electric motor which is actuated by an apparatus utilizing, for example, a position control circuit or integrating speed control circuit. Load sensing may then be performed by measurement of motor current or by a strain gage.

Still referring to FIG. 4, a load branch 20 includes a granular fertilizer feeder 146 which may be a positive displacement device for the removal of dry material from a bin or hopper 134 (FIG. 1) at a metered rate, the rate being proportional to the speed of operation of the device. In the preferred embodiment, feeder 146 is a rotating device such as an augur, a pocketed rotor similar and analogous to the impeller of a gear pump or a rigid vane pump, or a roll having a longitudinally fluted peripheral surface. In the illustrated instance, feeder 146 is driven by a hydraulic motor 232 which is actuated by a solenoid valve 148, but it may instead be driven by an electric motor actuated by a speed control circuit. A sensor 222 measures the speed of feeder 232, and provides a signal to DPU 238 for display as application rate of granular fertilizer as well as to a proportional controller (not shown) for use as a feedback signal in closed loop control of fertilizer application rate. Sensor 222 may be a tachometric device well known to those experienced in the art, such as a magnetic or phototach pickup, or may be a flow meter tee'ed as shown into the fluid supply line if hydraulic motor 232 is substantially a positive displacement device such as a piston motor.

Load branch 40 includes a granular herbicide/insecticide feeder 180 which is similar to the granular fertilizer feeder 146 discussed above, and is similarly driven by a motor 224 actuated by a valve 226 and is as well provided with a sensor 178 for measurement of feeder, or feeder motor, speed.

Load branch 30 includes a seed feeder 156 and its motor 160, actuator 228, and sensor 158, all of which may be similar to those referred to above for load branches 20 and 40 if implement 104 is a seed drill dispensing seed in a substantially constant flow to a seed bed. If implement 104 is a seed planter, however, dispensing seeds individually in a spaced apart manner, seed feeder 156 must be a device which meters seeds in a periodic manner, such as the Cyclo Air™ system produced by Case Corporation, assignee of the present invention. Nonetheless, associated motor 160, actuator 228, and sensor 158 may be similar to the devices described above and operate in similar fashions.

Referring still to FIG. 4, load branch 50 includes a fan 168 which provides low pressure air to vessels 136 and 156 (FIG. 1) such as bins, hoppers, tanks, or feeder drums located upon or within implement 104. In the illustrated instance, the fan 168 is driven by a hydraulic motor 170 the speed of which is controlled by an actuating valve 220. A first sensor 176 may be provided to measure speed of the fan or of its motor, and may provide a speed signal to DPU 238 (FIG. 5) for display upon DU 240 (also shown in FIG. 5) as speed of the fan 168 as well as to a proportional controller for use as a feedback signal in closed loop control of speed of motor 170 and hence of fan 168. A second sensor 166, which is illustrated as an air pressure transducer located in the vessel 136, or a velocity transducer located in an air conduit such as a duct, tube, or hose, may instead or also be provided. The second sensor 166 may then provide an air pressure or velocity signal to DPU 238 for display of an air pressure or velocity value, as well as to the proportional controller for use as a feedback signal in closed loop control of the fan speed in terms of air pressure or velocity, air pressure and velocity being functions of fan speed. A selector switch or similar means may be provided at the operator's station 108 (FIG. 1) for selection of which variable is to be controlled, though any or all may be displayed simultaneously if desired.

In load branches 60 and 70, configuration and operation of fans 196, 204 and their associated motors 198, 206, actuating valves 200, 208, speed transducers 202, 210, and pressure or velocity transducers 190, 194 may be similar to that of fan 168 and its associated devices in load branch 50 discussed above. While the fans 196, 204 have been shown in this hydraulic schematic diagram as being powered by hydraulic motors 198, 206 which are provided with hydraulic valves 200, 208 as actuators, they may instead be powered by electric motors having speed control circuits as actuators. Electrical power may then be drawn from the tractor 102 chassis supply, which is commonly available as 12 or 24 volts dc. Alternatively, some or all the fans may be, and in fact often are, powered by internal combustion engines, suitable actuators for which are throttle lever or fuel rate lever positioners which may include solenoids provided with pulse width modulated (PWM) control signals.

In load branch 80 illustrated schematically in FIG. 4, a liquid product feeder 150 may be a pump 150a driven by a hydraulic motor 230, which may be actuated by a solenoid valve 152. A sensor 154 may be provided to directly or indirectly measure flow rate of the liquid product. If the hydraulic motor 230 is a positive displacement device, liquid product flow rate may be measured and controlled as a function of motor 230 speed by use of a hydraulic fluid flow transducer 154a. If the product pump 150a is a positive displacement device, liquid product flow rate may be measured and controlled as a function of pump 150a speed by use of a tachometric sensor 154c. A product flow rate modulating valve 150b, which may be a solenoid operated valve controlled by a PWM signal, may be provided after the product pump 150a, in which case neither hydraulic motor 230 nor product pump 150a need be positive displacement devices. A sensor 154b, which may be a pressure transducer or a flow meter, may be provided in the liquid product dispensing conduit between the product pump 150a and the product valve 150b, and may provide a signal to DPU 238 (FIG. 5) for display of liquid product flow rate and/or pressure as well as to a proportional controller (not shown) for use as a feedback signal in closed loop control of liquid product flow rate and/or pressure to valve 150b.

Figure 5:
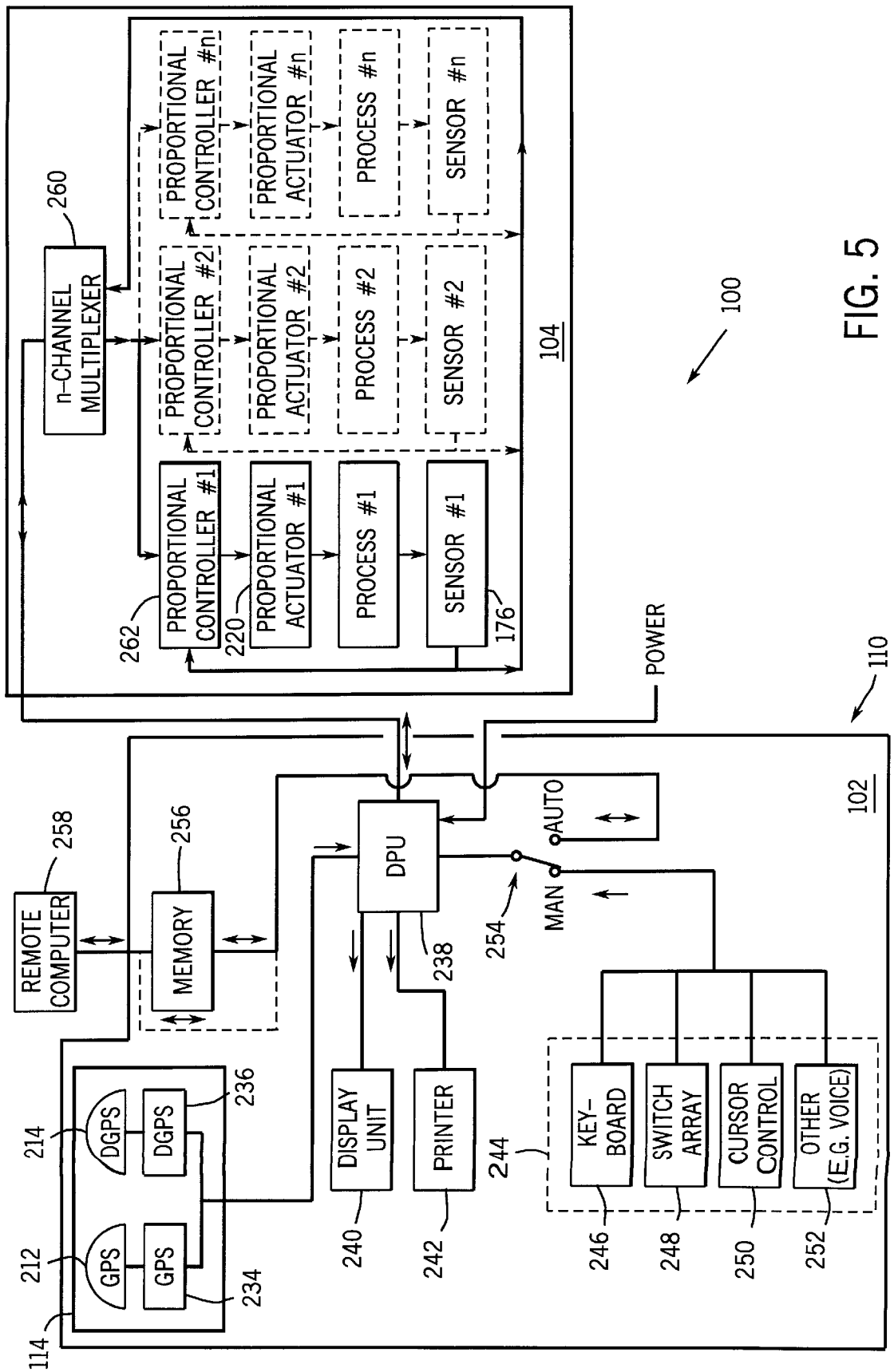
FIG. 5 is a block diagram of the control circuit of a system in accordance with the invention.

Referring now to FIG. 5, a farming system 100 includes a tractor or other vehicle 102 which supports the core subsystem 110 of an instrument and control system, and an implement 104 which supports devices and apparatus performing processes the monitoring and control of which are desired. Core subsystem 110 includes at least a data processing unit (DPU) 238, a display unit (DU) device 240, and an operator's input means 244. At least DU 240 and input means 244 are located at an operator's station 108 (not shown) convenient to the operator's line of sight and reach respectively.

DPU 238 may be a personal computer (PC) having a power supply compatible with tractor 102 DC chassis power and a microprocessor, and configured to generate graphics outputs in a format usable by DU 240. DU 240 is preferedly a flat screen, active matrix liquid crystal display (LCD) display capable of displaying full-motion video, graphics, and alphanumerics in a number of colors under widely varying ambient light conditions or other flat-panel display device, but may instead be a cathode ray tube (CRT) or may have only a monochrome display capability. Operator's input means 244 may include a full alphanumeric keyboard 246, or may include a means of selecting commands and set point values, increments, and decrements from setup screen displays on DU 240. Operator's input means 244 may be, for example, a separately packaged unit, may be combined with DPU 238 and/or DU 240 in a single bezel, or may be a touch screen key pad on the screen of DU 240.

Core subsystem 110 may be further provided with a printer or plotter 242 and/or additional operator's input devices such as a switch array 248, a trackball or other cursor control device 250, and/or an additional device 252 which may be a voice recognition system. Core subsystem 110 may also include a memory device 256 from which DPU 238 may read a prescription map which has been loaded off line on a remote office computer 258 having a geographic information system (GIS) or comparable database, and to which DPU 238 may write system 100 data in real time for later uploading off line to remote computer 258. Core subsystem 110 may further be provided a locational signal generating circuit 114 which may include a global positioning system (GPS) antenna 212 and receiver 234 as well as a differential global positioning system (DGPS) antenna 214 and receiver 236. A single antenna may instead be used for both GPS and DGPS broadcast signals, and GPS receiver 234 and DGPS receiver 236 may be configured as a single unit. Also included in core subsystem 110 may be a selector switch 254, keyboard command, or comparable means of allowing the operator to manually over ride a control set point signal received from memory 256.

Still referring to FIG. 5, implement 104 supports at least one apparatus performing a process which is to be monitored and controlled. This is performed by a proportional controller 262, which may be an open loop or closed loop device, which provides a control output signal to a proportional actuator 220. Actuator 220 performs a control action upon the process of interest, while a sensor 176 measures the present value of the process variable being controlled. Sensor 176 provides a signal proportional to, or otherwise representative of, the present value to proportional controller 262 for use as feedback if controller 262 is a closed loop device, and also to DPU 238 for processing and transmission to DU 240 for display of the present value. Also displayed may be the set point of the process of interest, which may have been obtained from operator input device 244, from memory 256, or directly from remote computer 258 through a wireless receiver (not shown). Additional processes may be monitored and/or controlled utilizing similar controlling, actuating, and sensing devices in substantially parallel loops as shown. Bus loading or wire count in the cable connecting implement 104 to tractor 102 may be reduced by use of a means of time sharing data conductors such as a signal multiplexer 260 or by use of data reduction software algorithms.

Although a variety of embodiments have been described herein, it should be understood that the above description is of preferred exemplary embodiments of the present invention, and that the invention is not limited to the specific forms described. For example, the rotational material feeders and motors described could be replaced by oscillating, or vibratory, feeders and appropriate driving devices. Solenoid operated valves could be replaced by valves operated instead by motors, compressed air, or hydraulic fluid. The liquid product feed pump could be replaced by pressurization of the liquid product storage tank. The proportional controllers could be replaced by control algorithms within or associated with DPU 238. Metering of granular materials by varying speed of a feeding device may be replaced or augmented by use of a gate controllably positionable in a chute or other material conduit, the gate positioned by a solenoid, motor operated leadscrew or ballscrew, hydraulic cylinder, or other actuator. Apparatus and devices termed "units" herein may in fact be distributed into two or more assemblies or subassemblies. Such other constructions are, nevertheless, considered within the scope of this invention. Accordingly, these and other substitutions, modifications, changes and omissions may be made in the design and arrangement of the elements and in their method of operation as disclosed herein without departing from the scope of the appended claims.

What is claimed is:

1. A system for the regulation of at least one operating parameter of an agricultural implement, the system comprising:

an agricultural work vehicle coupled to the implement for moving the implement across an agricultural field, the vehicle including an operator's station;

at least one open loop control circuit including means for inputting a set point and further including means for providing a control signal which is representative of the set point;

at least one actuator means supported by the implement, connected to the at least one control circuit, and which is actuatable by the control signal to cause the at least one parameter to be regulated by the control signal, wherein the at least one parameter achieves a steady-state operating value corresponding to the associated set point;

at least one sensor supported by the implement and configured to measure the actual value of the at least one parameter and to communicate the measured value to the operator's station; and a display device connected to the at least one control circuit and to the at least one sensor and configured to exhibit system information including at least the measured value of the at least one parameter.

2. The system of claim 1, comprising further a source of a fluid which is at least partially contained at a gage pressure, wherein:

the at least one controlled parameter is the pressure of the fluid;

the at least one sensor is a pressure transducer; and the at least one actuator means is a fluid flow interference device selected from the group including valves and dampers.

3. The system of claim 1, comprising further a source of a fluid which is at least partially contained at a gage pressure, wherein:

the at least one controlled parameter is the pressure of the fluid;

the at least one sensor is a pressure transducer; and the at least one actuator means is an apparatus for the adjusting of speed of a device selected from the group including fans, blowers, and pumps.

4. The system of claim 1, further comprising a source of hydraulic fluid under pressure, the implement having a support frame and a tool movable with respect to the frame, wherein:

the at least one parameter is the position of the tool with respect to the frame;

the at least one actuator means is a hydraulic cylinder, the hydraulic cylinder having a first end coupled to the frame and a second end coupled to the tool, whereby a change in length of the hydraulic cylinder causes a corresponding change in the position of the tool with respect to the frame, the cylinder moreover being connected through a fluid conduit to the source of pressurized hydraulic fluid whereby the length of the hydraulic cylinder is controlled by a valve connected in the path of the conduit between the fluid source and the cylinder; and the at least one sensor is a hydraulic cylinder extension measuring device.

5. The system of claim 1, further comprising a source of hydraulic fluid under pressure, the implement having a support frame and a tool movable with respect to the frame, wherein:

the at least one parameter is the force of penetration into the soil of the tool;

the at least one actuator means is a hydraulic cylinder, the hydraulic cylinder having a first end coupled to the frame and a second end coupled to the tool, the force exerted by the hydraulic cylinder upon the tool corresponding to the pressure of the hydraulic fluid contained within the hydraulic cylinder, the hydraulic cylinder being connected by a conduit to the source of pressurized hydraulic fluid, the pressure of the hydraulic fluid within the hydraulic cylinder being controlled by a valve connected in the path of the conduit between the fluid source and the cylinder, whereby force exerted by the cylinder upon the tool and hence by the tool upon the soil is controllably variable; and the at least one sensor is a hydraulic fluid pressure measuring device.

6. The system of claim 1, wherein the set point input means is a keypad which is overlaid upon a touch sensitive display screen.

7. The system of claim 1, wherein:

the implement is a seed planting device provided with a plurality of bins divided into at least two groups, each group comprising at least one bin;

each of the at least two groups of bins is provided with a fan to provide air under pressure to the bins within the group, the fan being coupled to a variable speed prime mover, the speed of the prime mover being varied in correspondence to the control signal by an actuator which is connected to the control circuit;

the control circuit is provided with an open loop control channel for each group of bins, each channel connected to the corresponding fan drive and including means for inputting of a set point and means for providing a speed control signal;

each group of bins is provided with at least one sensor connected to the display, the at least one sensor measuring one of fan speed and bin pressure; and the display exhibits the location of each bin and at least one of the measured pressure within each group of bins and the speed of each fan.

8. A system for the regulation of at least one operating parameter of an agricultural implement, the system comprising:

an agricultural work vehicle coupled to the implement for moving the implement across an agricultural field, the vehicle including an operator's station;

at least one closed loop control circuit including means for inputting a set point, means for receiving a feedback signal representative of the value of the parameter, means for providing a control signal, and means for varying the control signal to cause the value of the parameter to be substantially equal to that of the set point;

at least one actuator means supported by the implement, connected to the at least one control circuit, and which is actuatable by the control signal to cause the value of the at least one parameter to correspond to that of the control signal and thereby of the associated set point;

at least one sensor supported by the implement and configured to measure the actual value of the at least one parameter and to communicate the measured value to the control circuit; and a display device located at the operator's station, connected to the at least one control circuit and to the at least one sensor and configured to exhibit system information including at least the measured value of the at least one parameter.

9. The system of claim 8, comprising further a source of a fluid which is at least partially contained at a gage pressure, wherein:

the at least one controlled parameter is the pressure of the fluid;

the at least one sensor is a pressure transducer; and the at least one actuator means is a fluid flow interference device selected from the group including valves and dampers.

10. The system of claim 8, comprising further a source of a fluid which is at least partially contained at a gage pressure, wherein:

the at least one controlled parameter is the pressure of the fluid;

the at least one sensor is a pressure transducer; and the at least one actuator means is an apparatus for the adjusting of speed of a device selected from the group including fans, blowers, and pumps.

11. The system of claim 8, comprising further a source of flow of a material, wherein:

the at least one controlled parameter is the rate of flow of the material;

the at least one sensor is a material feeding and metering apparatus speed measuring device; and the at least one actuator means is a material feeding and metering apparatus speed control device.

12. The system of claim 8, comprising further a source of material flow, wherein:

the at least one controlled parameter is the rate of flow of the material;

the at least one sensor is a material feeding and metering apparatus speed measuring device; and the at least one actuator means is a material feeding and metering apparatus speed control device.

13. The system of claim 8, further comprising a source of hydraulic fluid under pressure, the implement having a support frame and a tool movable with respect to the frame, wherein:

the at least one parameter is the position of the tool with respect to the frame;

the at least one actuator means is a hydraulic cylinder, the hydraulic cylinder having a first end coupled to the frame and a second end coupled to the tool, whereby a change in length of the hydraulic cylinder causes a corresponding change in the position of the tool with respect to the frame, the cylinder being connected through a fluid conduit to the source of pressurized hydraulic fluid whereby the length of the hydraulic cylinder is controlled by a valve connected in the path of the conduit between the fluid source and the cylinder; and the at least one sensor is a hydraulic cylinder extension measuring device.

14. The system of claim 8, further comprising a source of hydraulic fluid under pressure, the implement having a support frame and a tool movable with respect to the frame, wherein:

the at least one parameter is the force of penetration into the soil of the tool;

the at least one actuator means is a hydraulic cylinder, the hydraulic cylinder having a first end coupled to the frame and a second end coupled to the tool, the force exerted by the hydraulic cylinder upon the tool corresponding to the pressure of the hydraulic fluid contained within the hydraulic cylinder, the hydraulic cylinder being connected by a conduit to the source of pressurized hydraulic fluid, the pressure of the hydraulic fluid within the hydraulic cylinder being controlled by a hydraulic control valve connected in the path of the conduit between the fluid source and the cylinder, whereby force exerted by the cylinder upon the tool and hence by the tool upon the soil is controllably variable; and the at least one sensor is a hydraulic fluid pressure measuring device.

15. The system of claim 8 wherein the means for inputting of a set point is a keypad which is overlaid upon a touch sensitive display screen.

16. The system of claim 8, wherein:

the implement is a seed planting device provided with a plurality of bins divided into at least two groups, each group comprising at least one bin;

each of the at least two groups of bins is provided with a fan to provide air under pressure to the bins within the group, the fan being coupled to a variable speed prime mover, the speed of the prime mover being varied in correspondence to the control signal by an actuator which is connected to the control circuit;

the control circuit is provided with a closed loop control channel for each group of bins, each channel connected to the corresponding fan drive and including means for inputting of a set point, means for receiving a feedback signal representative of the value of the parameter, and means for providing a speed control signal;

each group of bins is provided with at least one sensor connected to the display and to the corresponding control circuit channel, the at least one sensor measuring one of fan speed and bin pressure; and the display exhibits the location of each bin and at least one of the measured pressure within each group of bins and the speed of each fan.

17. A system for the control of depth of penetration into the soil of at least one agricultural tool, the system comprising:

an agricultural work vehicle, including an operator's station;

an agricultural implement connected to the vehicle and including a frame which remains at a substantially constant distance above the surface of the soil and at least one tool which is controllably movable with respect to the frame generally downwardly into the soil;

a control circuit supported by the vehicle and including means for inputting a set point and means for providing a control signal;

a source of hydraulic fluid under pressure;

at least one hydraulic cylinder supported by the implement, having a first end connected to the frame and a second end connected to the at least one tool, and configured to move the at least one tool into the soil when presented with hydraulic fluid under pressure through a fluid port located in the cylinder;

a hydraulic cylinder control valve located in the path of a hydraulic fluid conduit, coupling the hydraulic fluid source to the fluid port, and actuatable in correspondence to the control signal;

a hydraulic cylinder extension measuring device supported by the implement, connected to the control circuit, and configured to measure the position of the at least one tool; and a display device supported by the tractor, connected to the control circuit, and configured to exhibit system information including at least measured present tool position data.

18. The system of claim 17, additionally comprising:

a keypad, connectable to the control circuit by a first operator actuation of means for manual input of a constant set point, the keypad and input means located at the operator's station;

memory device, connectable to the control circuit by a second operator actuation of the input means and programmed with a precision farming prescriptive map containing spatially variable, site-specific soil penetration depth set point data correlated with corresponding site locational data;

an electronic locational signal generating subsystem connected to the control circuit and including an antenna, receiver, and signal conditioning circuit, which subsystem is a global positioning system (GPS) whose accuracy and repeatability is enhanced by a differential global positioning subsystem (DGPS); and means within the control circuit for comparing the locational signal to the locational data and to enter the corresponding correlated programmed set point data when the location signal and the locational data substantially coincide.

19. The system of claim 17, additionally comprising:

a keypad, connectable to the control circuit by a first operator actuation of means for manual input of a constant set point, the keypad and input means located at the operator's station;

a wireless signal receiving device, connectable to the control circuit by a second operator actuation of the input means for the receiving in real time of a precision farming prescriptive map containing spatially variable, site-specific soil penetration depth set point data correlated with corresponding site locational data;

an electronic locational signal generating subsystem connected to the control circuit and including an antenna, receiver, and signal conditioning circuit, which subsystem is a global positioning system (GPS) whose accuracy and repeatability is enhanced by a differential global positioning subsystem (DGPS); and means within the control circuit for comparing the locational signal to the locational data and to enter the corresponding correlated programmed set point data when the location signal and the locational data substantially coincide.

20. The system of claim 17, wherein the at least one agricultural tool includes a planting implement ground opening tool.

* * * * *

UNITED STATES PATENT AND TRADEMARK OFFICE
CERTIFICATE OF CORRECTION

PATENT NO.  : 6,003,455
DATED       : December 21, 1999
INVENTOR(S) : David Flamme; Peter Dix It is certified that error appears in the above-identified patent and that said Letters Patent is hereby corrected as shown below:

In claim 2, column 14, line 56, delete "controlled".

In claim 3, column 14, line 65, delete "controlled".

In claim 9, column 16, line 34, delete "controlled".

In claim 10, column 16, line 43, delete "controlled".

In claim 11, column 16, line 51, delete "controlled".

In claim 12, column 16, line 59, delete "controlled".

In claim 18, column 18, line 38, insert --a-- before "memory".

Signed and Sealed this

Twenty-fifth Day of July, 2000

Q. TODD DICKINSON

Attest:

Attesting Officer

Director of Patents and Trademarks